United States Patent
Han et al.

(10) Patent No.: US 8,805,106 B2
(45) Date of Patent: Aug. 12, 2014

(54) SYSTEM AND METHOD FOR COMPRESSING AND DECOMPRESSING IMAGES AND VIDEO

(75) Inventors: Bing Han, Gainesville, FL (US); Dapeng Oliver Wu, Gainesville, FL (US); Jun Tian, Plainsboro, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 593 days.

(21) Appl. No.: 12/566,473

(22) Filed: Sep. 24, 2009

(65) Prior Publication Data

US 2010/0080473 A1     Apr. 1, 2010

Related U.S. Application Data

(60) Provisional application No. 61/100,620, filed on Sep. 26, 2008.

(51) Int. Cl.
*G06K 9/36* (2006.01)
*G06K 9/46* (2006.01)
*H04N 7/26* (2006.01)
*H04N 7/30* (2006.01)

(52) U.S. Cl.
CPC ... *H04N 19/00775* (2013.01); *H04N 19/00278* (2013.01); *H04N 19/0078* (2013.01); *H04N 19/0296* (2013.01); *H04N 19/00563* (2013.01); *H04N 19/00127* (2013.01); *H04N 19/00545* (2013.01); *H04N 19/00533* (2013.01)
USPC ........... 382/239; 382/232; 382/233; 382/248; 382/250

(58) Field of Classification Search
USPC ................. 382/232, 233, 238, 239, 244–253
See application file for complete search history.

(56) References Cited

U.S. PATENT DOCUMENTS

| 5,859,668 | A | 1/1999 | Aono et al. | |
|---|---|---|---|---|
| 2003/0031454 | A1 | 2/2003 | Kameyama | |
| 2003/0058347 | A1 | 3/2003 | Lee | |
| 2004/0170395 | A1* | 9/2004 | Filippini et al. | 386/111 |
| 2005/0046738 | A1 | 3/2005 | Sato | |
| 2006/0027656 | A1 | 2/2006 | Aoike | |
| 2006/0239336 | A1 | 10/2006 | Baraniuk et al. | |

(Continued)

FOREIGN PATENT DOCUMENTS

| CN | 1394440 A | 1/2003 |
|---|---|---|
| CN | 1777039 A | 5/2006 |

OTHER PUBLICATIONS

Zhang et al., "A novel image/video coding method based on compressed sensing theory," ICASSP 2008, Mar. 30-Apr. 4, 2008, Las Vegas, Nevada, USA.*

(Continued)

*Primary Examiner* — Anand Bhatnagar
*Assistant Examiner* — Soo Park
(74) *Attorney, Agent, or Firm* — Slater & Matsil, L.L.P.

(57) ABSTRACT

A system and method for image and video compression and decompression using compressive sensing is provided. A method for decompressing a compressed image, where the compressed image having a plurality of compressed image blocks, and the method is performed on a processor, includes selecting a compressed image block, entropy decoding the selected compressed image block, and recovering an image block corresponding to the decoded selected compressed image block using compressive sensing recovery.

16 Claims, 3 Drawing Sheets

(56) References Cited

U.S. PATENT DOCUMENTS

2007/0027656 A1    2/2007    Baraniuk et al.
2008/0129560 A1    6/2008    Baraniuk et al.
2008/0175498 A1*   7/2008    Lee et al. ............... 382/238

OTHER PUBLICATIONS

Gan et al., "Fast compressive imaging using scrambled block Hadamard ensemble", Proc. EUSIPCO 2008, Aug. 2008.*

Lillo et al., "Improved random sampling reconstruction for in-vivo data suing discrete cosine transform", Proceedings of the 14th Annual Meeting of ISMRM, 2006.*

Moravec et al., "Compressive phase retrieval", Wavelets XII. Proc. SPIE 6701, 670120, 2007.*

Stankovic et al., "Compressive video sampling", Proc. EUSIPCO, Aug. 2008.*

Candes, E., et al., "Robust Uncertainty Principles: Exact Signal Reconstruction from Highly Incomplete Frequency Information," IEEE, pp. 1-41, Jun. 2004, Revised Aug. 2005.

Donoho, D.L., "Compressed Sensing," IEEE Transactions of Information Theory, vol. 52, No. 4, Apr. 2006, pp. 1289-1306.

Kim, T-H, et al., "Image Dequantization: Restoration of Quantized Colors," Eurographics 2007, vol. 26, No. 3, 8 pages, Blackwell Publishing.

Price, J.R., et al., "Dequantization Bias for JPEG Decompression," ICIT 2000, 6 pages.

Zhang, Y., et al., "A Novel Image/Video Coding Method Based on Compressed Sensing Theory," ICASSP 2008, pp. 1361-1364.

"Notification of Transmittal of the International Search Report and the Written Opinion of the International Searching Authority, of the Declaration," International Application No. PCT/CN2009/074217, Applicant: Huawei Technologies Co., Ltd., et al., mailing date: Dec. 31, 2009, 15 pages.

* cited by examiner

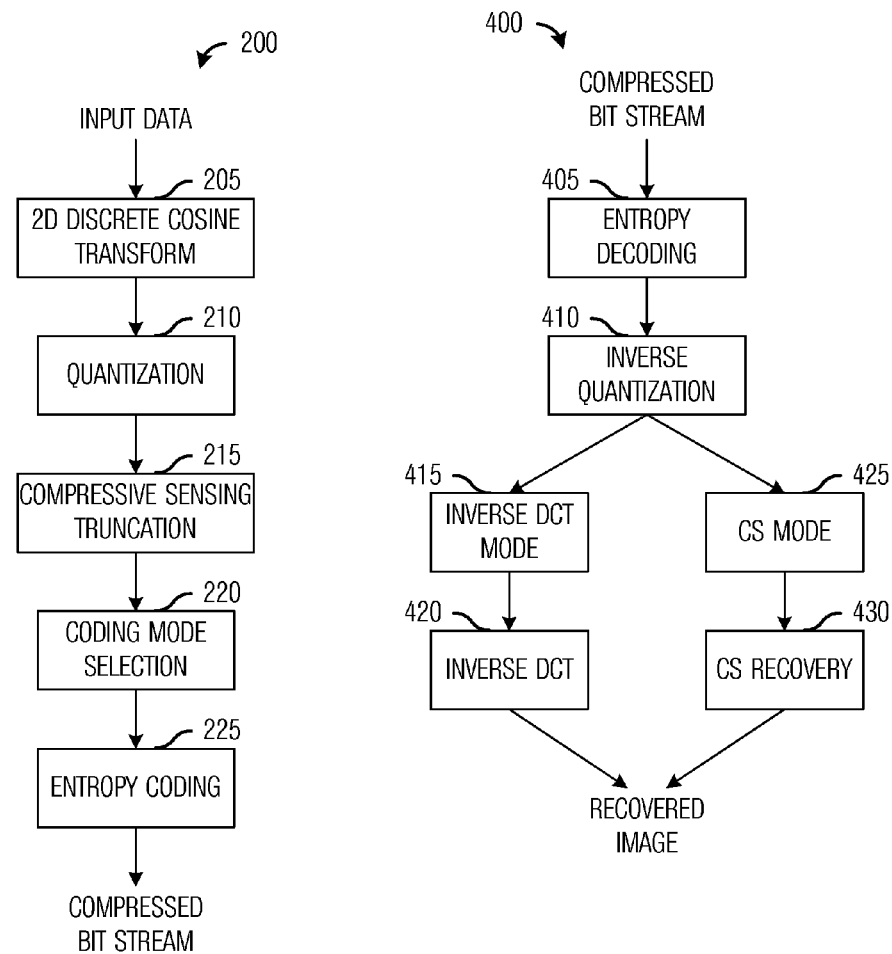
*Fig. 2*
*Fig. 4*
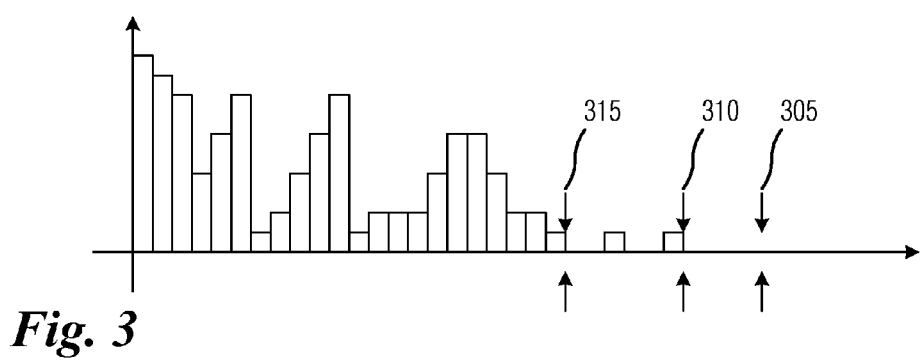
*Fig. 3*

SYSTEM AND METHOD FOR COMPRESSING AND DECOMPRESSING IMAGES AND VIDEO

This application claims the benefit of U.S. Provisional Application No. 61/100,620, filed on Sep. 26, 2008, entitled "Compressive Sensing in Image/Video Compression," which application is hereby incorporated herein by reference.

TECHNICAL FIELD

The present invention relates generally to visual communications, and more particularly to a system and method for image and video compression and decompression using compressive sensing.

BACKGROUND

Generally, image and video compression involves the application of data compression on digital images (either individual stand alone images or images that are part of image sequences in a video). Image compression may be used as a general term to apply to both image compression and video compression. An objective of image compression is to reduce redundancy present in image data in order to store and/or transmit images in an efficient form.

Joint Photographic Expert Group (JPEG) defined an image compression method that has become a technical standard and is widely used for compressing digital images. JPEG compression utilizes lossy compression, meaning that some visual quality is lost in the compression process and cannot be restored. Standard JPEG decompression reconstructs quantized discrete cosine transform (DCT) coefficients to a center of a quantization bin. This may fail to exploit a non-uniform distribution of AC coefficients. Commonly used dequantization techniques assume a Laplacian distribution instead of a uniform distribution, which can achieve 0.25 dB using a maximum likelihood (ML) estimate.

In work by E. Candes, et. al., entitled "Quantitative Robust Uncertainty Principles and Optimally Sparse Decomposition," IEEE Transactions on Information Theory, 52(2), pp. 489-509, February 2006 and by D. Donoho, entitled "Compressive Sensing," IEEE Transactions on Information Theorgy, 52(4), pp. 1289-1306, April 2006, compressive sensing (CS) theory is presented. They demonstrate that information contained in a few significant coefficients may be captured by a small number of random linear projections. An original signal may then be reconstructed from the random linear projections using an appropriate decoding scheme. Furthermore, the two references have shown that it is possible to reconstruct a compressive signal by solving a convex optimization problem.

SUMMARY OF THE INVENTION

These and other problems are generally solved or circumvented, and technical advantages are generally achieved, by embodiments of a system and method for image and video compression and decompression using compressive sensing In accordance with an embodiment, a method for decompressing a compressed image is provided. The compressed image having a plurality of compressed image blocks, and the method is performed on a processor. The method includes selecting a compressed image block, entropy decoding the selected compressed image block, and recovering an image block corresponding to the decoded selected compressed image block using compressive sensing recovery.

In accordance with another embodiment, a method for decompressing a compressed image is provided. The compressed image having a plurality of compressed image blocks, and the method is performed on a processor. The method includes a) selecting a compressed image block, b) entropy decoding the selected compressed image block, c) in response to determining that the decoded selected compressed image block was compressed without compressive sensing, transforming the decoded selected compressed image block into a pixel domain image block, and d) in response to determining that the decoded selected compressed image block was compressed with compressive sensing, recovering an image block corresponding to the decoded selected compressed image block using compressive sensing recovery.

In accordance with another embodiment, a method for compressing an image having a plurality of image blocks is provided. The method is performed on a processor. The method includes selecting an image block from the plurality of image blocks to compress, computing a sum of sinusoidal signals at different frequencies and amplitudes representation for the selected image block, quantizing the amplitudes of the sinusoidal signals at different frequencies, and saving the quantized amplitudes as a first compressed image block. The method also includes truncating the quantized amplitudes, thereby producing truncated quantized amplitudes, saving the truncated quantized amplitudes as a second compressed image block, and selecting either the first compressed image block or the second compressed image block as a final compressed image block. The selecting is based on a measure of the quality of the first compressed image block and the second compressed image block.

An advantage of an embodiment is that a coding mode may be selected based on rate distortion present in the image blocks of the image being compressed. This allows for the use of different coding modes optimized for different amounts of distortion present in the image being compressed.

A further advantage of an embodiment is that images compressed using compressive sensing may be decoded using a standard decoder. This may allow for rapid deployment of the embodiment without having to immediately upgrade decoders.

Yet another advantage of an embodiment is that better image compression ratios may be attained while maintaining consistent image quality or improved image quality may be achieved while maintaining consistent image compression ratios.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 2 is a flow diagram of operations in image compression;

FIG. 3 is a data plot of coefficient values;

FIG. 4 is a flow diagram of operations in image decompression;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an image decompression system that makes use of compressive sensing. The invention may also be applied, however, to an image compression system that makes use of compressive sensing. The invention may also be applied to video compression and/or decompression systems that make use of compressive sensing.

Figure 1:
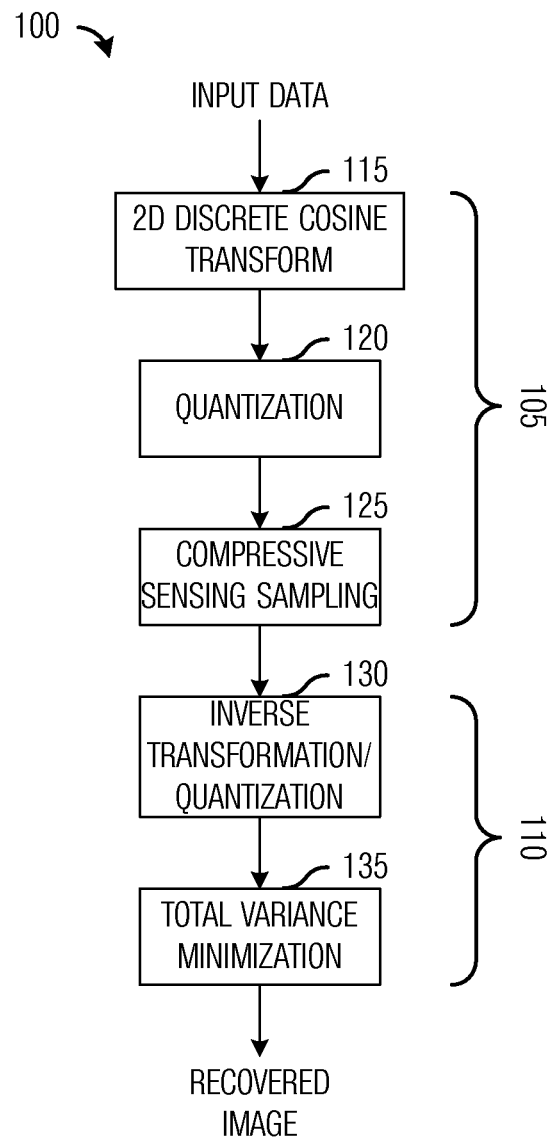
FIG. 1 is a flow diagram of operations occurring in the processing (compressing and decompressing) of an image.

FIG. 1 illustrates a flow diagram of operations 100 occurring in the processing (e.g., compressing and decompressing) of an image. Operations 100 may be indicative of operations taking place in an image processing system and may illustrate operations taking place in an image compressing unit and/or an image decompressing unit of the image processing system. Additional operations may be performed. Operations 100 may occur whenever an image is received for compression by the image compressing unit of the image processing system or when a compressed image is received for decompression by the image decompressing unit of the image processing system. Operations 100 may operate until the image processing system is stopped, powered off, reset, or otherwise halted.

Operations 100 may be separated into two distinct stages, an image compression stage 105 and an image decompression stage 110. The two stages of operations 100 may operate independently of one another. For example, image compression stage 105 may be in continuous operation to compress a large number of images, with the compressed images being stored in a memory. In such a situation, image decompression stage 110 may not be used. Similarly, image decompression stage 110 may be used to decompress a large number of compressed images for display purposes. When images are being decompressed, it may not be necessary to make use of image compression stage 105.

In general, image compression stage 105 may be broken down into three distinct operations. A first operation in image compression stage 105 may be applying a transform to blocks of image data of an image being compressed (block 115). According to an embodiment, the transform may be a two-dimensional discrete cosine transform (DCT). A two-dimensional DCT may be used to express data points as a sum of cosine functions at different frequencies. A two-dimensional DCT is similar to a two-dimensional discrete Fourier transform (DFT) except that a two-dimensional DCT is real-valued, while a two-dimensional DFT is complex-valued.

After applying the transformation, e.g., the two-dimensional DCT, to blocks of image data, the coefficients of the cosine functions at the different frequencies may be quantized (block 120). In addition to converting an analog value to a digital value, quantization may also achieve space savings by reducing the amount of information needed to store the coefficients. However, the space savings may be achieved at a cost of error introduced by the quantization process. Generally, the fewer the number of quantization bits used to represent the coefficients, the greater the error introduced by the quantization process.

Compressive sensing (CS) sampling may then be applied (block 125). Compressive sensing sampling may involve the sorting of the coefficients arising from the application of the two-dimensional DCT on the block of image data. According to an embodiment, the coefficients are sorted based on their positions (frequencies) and not their values. After the coefficients have been sorted, then some of the coefficients may be truncated (discarded). For example, a number of the highest coefficients (i.e., the higher frequency coefficients) may be truncated. The truncation of some of the coefficients may lead to further space savings. However, if too many coefficients are truncated, then image quality may be negatively impacted. Image compression stage 105 may then terminate.

If compressive sensing sampling is not applied, then image compression stage 105 may terminate after quantization of coefficients of the cosine functions at the different frequencies (block 120). This may be equivalent to typical image compression techniques, such as one used in JPEG compression.

Like image compression stage 105, image decompression stage 110 may be broken down into several distinct operations. The operation of image decompression stage 110 may depend on if compressive sensing was used to compress the image. If compressive sensing was not used, then a first operation in image decompression stage 110 may be applying an inverse transform to blocks of compressed image data of an image being decompressed (block 130). The blocks of compressed image data may be in the form of quantized coefficients of cosine functions at different frequencies. According to an embodiment, the inverse transform may be a two-dimensional inverse discrete cosine transform (IDCT). A two-dimensional IDCT may be used to reverse the operation of the two-dimensional DCT used to compress the blocks of image data and may reconstruct blocks of image data of an image from the blocks of compressed image data. Image decompression stage 110 may then be complete.

However, if image decompression with compressive sensing is used, then after inverse quantization (block 130), compressive sensing recovery with total variance minimization may be used to recover image data from the blocks of image data (block 135). A detailed discussion of the use of compressive sensing recovery with total variance minimization to recover image data is presented below. Image decompression stage 110 may then be complete.

FIG. 2 illustrates a flow diagram of operations 200 in image compression. Operations 200 may be a detailed view of an implementation of image compression stage 105, wherein both typical image compression and image compression with compressive sensing (CS) may be used to compress blocks of image data. The image compression technique (either typical image compression or image compression with CS) may be selected based on the nature of the block of image data being compressed.

As discussed previously, image compression stage 105 may make use of a typical image compression technique, such as one used in JPEG compression, or image compression with compressive sensing (CS). In general, depending on the nature of the image (or image blocks of the image) being compressed, additional compressive gain may be obtained if image compression with CS is used. Therefore, image compression stage 105 may be configured so that typical image compression is always performed and then a check or test may be performed to determine if the image (or image block) is a candidate for further image compression with CS.

Rate distortion optimization (RDO) adaptive selection may be used to optimize an amount of distortion with an amount of data required to encode the image (or image blocks of the image) to determine if typical image compression or image compression with CS will yield better results. If RDO adaptive selection determines that an image (or image block) may be a good candidate for image compression with CS, then after typical image compression, CS may be applied to the image (or image block). If RDO adaptive selection determines that an image (or image block) may not be a good candidate for image compression with CS, then image compression may stop with typical image compression.

A flag may be associated with each image (or image block) to indicate which form of image compression was used to compress the image (or image block). For example, the flag may be set to a first value to indicate that typical image compression was used, while if image compression with CS was used, then the flag may be set to a second value. The flag may be stored along with the image (or image block) so that the flag is always available for use by an image decompression unit.

Although the use of the flag may help to further enhance image quality when the image is being decompressed, an advantage of an embodiment is that images (or image blocks) compressed using image compression with CS may be decompressed using typical image decompression, i.e., image decompression without CS, with a resulting image quality that is comparable to that of the same image compressed using typical image compression and then decompressed using typical image decompression.

The one-dimensional array of coefficients may be quantized to a specified number of bits per coefficient (block 210). For example, each coefficient may be quantized to one, two, three bits, or so forth, with the number of bits being dependent on factors such as desired image quality, desired compressed image size, desired compression and decompression computational requirements, and so forth.

If RDO adaptive selection has determined that the block of image data is a candidate for image compression with CS, then compressive sensing truncation may be applied (block 215). Compressive sensing truncation may involve a truncation of a number of the coefficients arising from the application of the two-dimensional DCT on the block of image data. For example, a number of the highest coefficients may be truncated. The number of coefficients truncated may be dependent on factors such as desired image quality, desired compressed image size, desired compression and decompression computational requirements, and so forth.

According to an embodiment, only the highest frequency coefficients are truncated and a preferred number of coefficients being truncated may be about 10 to 15% of a total number of coefficients. Generally, if too many coefficients are truncated, then too much information may be lost and image quality may be negatively impacted.

According to an alternative embodiment, the number of coefficients that are truncated may be determined dynamically based on an analysis of the coefficients. For example, if after analysis, a number of coefficients X (where X is a positive integer value) may be truncated, wherein the X coefficients may account for a specified percentage of coefficients in the block of image data.

FIG. 3 illustrates a data plot 300 of coefficient values. Data plot 300 illustrates a hard coefficient cutoff (shown as highlight 305) is above a highest coefficient having a non-zero value (highlight 310 shows a highest coefficient having a non-zero value). Therefore, eliminating coefficients above the hard coefficient cutoff may not result in significant space savings. Analysis of the coefficients may indicate a target coefficient such that truncating coefficients above the target coefficient may impact the image quality by less than a threshold (shown as highlight 315). Compressive sensing truncation may then truncate coefficients above the target coefficient.

Referencing back to FIG. 2, after compressive sensing truncation, a coding mode for the block of image data may be selected (block 220). According to a preferred embodiment, either typical image compression or image compression with CS may be selected as the coding mode for the block of image data. The selected coding mode may be used to set the flag associated with the block of image data to indicate the coding mode used to encode (compress) the block of image data.

Several techniques may be used to select the coding mode for the block of image data: brute force, a total variance indication method, a texture analysis method, and so forth. With the brute force method, both a typical image decompression coding mode and the image decompression with CS coding mode may be applied to the block of compressed image data to reconstruct the block of image data from the block of compressed image data. The corresponding reconstructed blocks of image data may be compared and the coding mode that produced the better result is selected.

With the total variance indication method, a total variance of the image block before quantization and a total variance of the image block after quantization are compared. If the total variance after quantization is greater than the total variance before quantization, the image compression with CS coding mode is selected. If the total variance after quantization is less than the total variance before quantization, the typical image compression coding mode is selected.

With the texture analysis method, the block of image data may be classified into one of three classes: low texture, medium texture, or high texture. The block of image data is classified based on the texture statistics of the block of image data. If the block of image data is classified as a medium texture block, image compression with CS coding mode may be selected. If the block of image data is classified as either a low texture block or a high texture block, then typical image compression coding mode may be selected.

Other methods may be used for coding mode selection. For example, heuristic methods, methods that may be based on visual characteristics of the block of image data or the image itself, methods that employ computer vision and pattern recognition algorithms to classify the blocks of image data into total variance mode and non-total variance mode blocks, and so forth, may be used and are within the scope and spirit of the embodiments.

After coding mode selection (block 220), entropy coding may be used to code the blocks of compressed image data, thereby producing a compressed bit stream (block 225). For example, there may be two types of entropy coding implemented: context-based adaptive binary arithmetic coding (CABAC) and variable-length coding (VLC).

FIG. 4 illustrates a flow diagram of operations 400 in image decompression. Operations 400 may be a detailed view of an implementation of image decompression stage 110, wherein both typical image decompression and image decompression with compressive sensing (CS) may be used to decompress blocks of image data. The image decompression technique (either typical image decompression or image decompression with CS) may be selected based on the value of a flag associated with each block of compressed image data.

As discussed previously, image decompression stage 110 may make use of a typical image decompression technique, such as one used in JPEG decompression, or image decompression with compressive sensing (CS). A block of compressed image data or the compressed image data may have associated with it a flag indicating the compression coding technique used. However, the decompression of a block of compressed image data compressed using image compression with CS may still produce acceptable results.

Operations 400 may begin with image decompression stage 110 receiving a compressed bit stream, to which, image decompression stage 110 may apply entropy decoding (block 405). Entropy decoding may be used to reverse the entropy encoding applied to blocks of compressed image data at image compression stage 105. After entropy decoding, blocks of compressed image data may be unquantized (block 410).

Based on the flag indicating the compression coding technique used to compress the block of image data, image decompression stage 110 may apply one of two image decompression techniques. For example, if the flag indicates that typical image compression was used, then image decompression stage 110 may apply typical image decompression to decompress the block of compressed image data. First, image decompression stage 110 may enter typical image decompression mode (block 415), and then image decompression stage 110 may apply an inverse transform, such as an inverse DCT, to the block of compressed image data to recover the block of image data (block 420). The inverse transform, such as the inverse DCT, may transform the block of compressed image data back into a pixel domain image block. Image decompression stage 110 may continue decompressing the blocks of compressed image data until it has recovered the image in its entirety and operations 400 may then terminate.

If the flag indicates that image compression with CS was used to compress the block of compressed image data, then image decompression stage 110 may apply image decompression with CS to decompress the block of compressed image data. First, image decompression stage 110 may enter image decompression with CS mode (block 425), and then image decompression stage 110 may use CS recovery to recover the block of image data from the block of compressed image data (block 430).

CS recovery (block 430) may make use of a total variance minimization optimization algorithm to recover the image data. Total variance minimization optimization may be a reformulation of a standard optimization process, wherein a cost function (total variance function in this instance) is minimized based on a set of one or more constraints. The minimization optimization may continue until consecutive minimization operations results in a change in the value of the cost function that is less than a specified threshold. Candes has shown that as long as the blocks of compressed image data is sparse, then it is possible to recover the blocks of uncompressed image data (along with some noise) using total variance minimization optimization.

The recovery of the image from blocks of compressed image data compressed using image compression with CS may be recast as a second order cone programming (SOCP) problem expressible as:

$$\hat{s} = \arg\min TV(s), \text{ s.t. } \Theta\hat{s} = y, \quad (1)$$

where $\hat{s}$ is a recovered signal, s is an original signal, and y are the measurements of the signal s. The total variance may be defined as a sum of the magnitudes of the discrete gradient at every pixel.

An image itself may not be sparse, but the gradient map of the image may be considered to be a two-dimensional sparse signal. Let be $x_{ij}$ a pixel in an i-th row and j-th column of an n×n image x. The following operators (discrete gradient vectors where h and v represent horizontal and vertical directions, respectively) may be defined:

$$D_{h;ij}x = \begin{cases} x_{i+1,j} - x_{ij} & i < n \\ 0 & i = n; \end{cases}$$

$$D_{v;ij}x = \begin{cases} x_{i,j+1} - x_{ij} & i < n \\ 0 & i = n; \end{cases}$$

and $$D_{ij}x = \begin{pmatrix} D_{h;ij}x \\ D_{v;ij}x \end{pmatrix}.$$

The total variation of x may then be defined as a sum of the magnitudes of discrete gradients $D_{h;ij}x$ and $D_{v;ij}x$ and is expressible as:

$$TV(x) = \sum_{ij} \sqrt{(D_{h;ij}x)^2 + (D_{v;ij}x)^2} = \sum_{ij} \|D_{ij}x\|_2.$$

In order to recover the image data from the CS samples, a two-dimensional DCT may be used for each block of compressed image data and as well as a bounded residue constraint. Since in most cases the measurements are inaccurate, it may be necessary to consider CS in realistic scenarios wherein the signal may not be completely sparse and the measurements are noisy. Suppose that the noise measurements are expressible as:

$$y = Ax_0 + e \quad (2)$$

In this situation, the noise term is the error caused by the quantization of the CS measurements. In Candes' work, a quadratic constraint is proposed to stably solve this problem. The quadratic constraint is expressible as:

$$\min\|x\|_{l_1} \text{ subject to } \|Ax - y\|_{l_2} \leq \epsilon \quad (3)$$

Where x is the image block to be decoded, A is a measurement matrix, y is measurements of the image block x, and $\epsilon$ is an error constraint. Candes' work shows that the solution to Equation (2) recovers an unknown sparse object with an error that is at most proportional to the noise level.

$$\|x^\# - x_0\|_{l_2} \leq C^* \epsilon \quad (4)$$

where $x^\#$ is the solution given by Equation (3), C is a constant that may only depend on the restricted isometry property of A. A typical value of C may be around 10.

Candes further specifies that this perturbation to be a round-off or quantization error. An experiment conducted using scrambled Fourier ensemble and the measurements are quantized to one digit (the values of the measurements may be restricted to one of ten equally spaced preset values). In order to choose $\epsilon$, Candes uses a rough model for the size of the perturbation. The quantization error may be taken as a uniformly distributed random variable on $(-q/2, q/2)$ where q is the distance between quantization levels.

Under this assumption, the size of the perturbation $\|\epsilon\|_{l_2}$ may be modeled as the sum of squares of uniform random variables. Then, with high probability, $\|\epsilon\|_{l_2}$ is no larger than $\min(\|\epsilon\|_{l_2})+\lambda\mathrm{std}(\|\epsilon\|_{l_2})$. In Y. Zhang et. al., for example, $\epsilon$ is chosen to be:

$$\varepsilon^2 = \frac{nq^2}{12} + \frac{\lambda\sqrt{n}\,q^2}{6\sqrt{5}}. \quad (5)$$

The problem may then be solved with total variance as $$\min\|x\|_{TV} \text{ subject to } \|Ax-y\|_{l_2} \leq \epsilon. \quad (6)$$

The performance may be improved by properly choosing $\epsilon$. Three typical values of $\epsilon$ may be selected to compare with the CS reconstruction performance. Besides for the value of $\epsilon$ given in Equation (6), the quantization step size q and the actual quantization error e may also be used. The value of $\epsilon$ may then be tested on several typical blocks of image data. The testing shows that using the quantization step size q yields the best performance. Additional testing may be performed with a variable value of $\epsilon$. The performance comparisons show that with several different quantization step sizes, the optimal value of $\epsilon$ is near the quantization step size.

It may also be possible to revise the constraint or add new constraints that better model the quantization error. For example, instead of finding a global optimal solution, it may be possible to finding feasible points x which are locally optimal. Since scalar quantization is used in the encoding of the image data, a bounded residue constraint may be proposed to solve this problem. The bounded residue constraint may be defined as:

$$\min\|x\|_{TV} \text{ subject to } -q/2 \leq Ax-y \leq q/2. \quad (7)$$

Where x is the image block to be decoded, A is a measurement matrix, y is measurements of the image block x, and q is a quantization step size. Since the quantization step size is known, it is possible to find a region containing all possible candidate signals.

An advantage of the embodiments is that a new image/video coding scheme that can represent the image/video more efficiently is proposed. Compressive sensing may be integrated to recover the coded image instead of using an IDCT as in JPEG image decompression. In this way, coding efficiency may be obtained.

Image decompression stage 110 may continue decompressing the blocks of compressed image data until it has recovered the image in its entirety and operations 400 may then terminate.

Figure 5A:
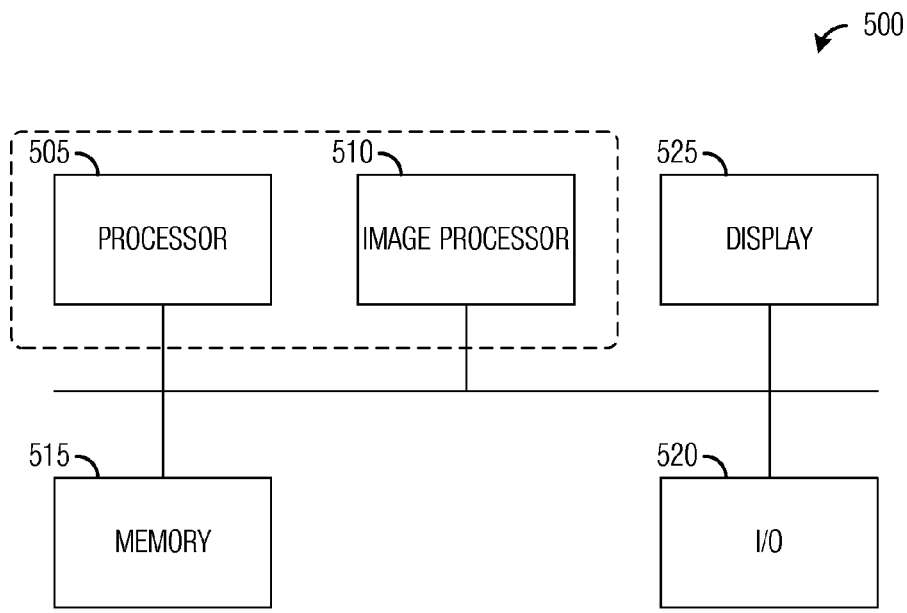
FIG. 5*a* is a diagram of an image encoding and/or decoding system.

FIG. 5a illustrates an image encoding and/or decoding system 500. Image encoding and/or decoding system 500 may be used for image encoding, image decoding, or both, depending on the capabilities of an image processor included in image encoding and/or decoding system 500. A typical implementation of image encoding and/or decoding system 500 would be capable of performing both image encoding and decoding.

Image encoding and/or decoding system 500 may be used to encode (compress) an image. Compressing the image may reduce storage requirements when the image is to be stored and may reduce transmission bandwidth requirements when the image is to be transmitted. According to the JPEG standard, compressing an image includes applying a discrete cosine transform to the image and then quantizing the coefficients of the output of the discrete cosine transform. Quantizing the coefficients results in the size reduction of the image. Image encoding and/or decoding system 500 may also make use of compressive sensing to compress the image. According to a preferred embodiment, image encoding and/or decoding system 500 may compress the image using both standard image compression techniques and image compression with CS and then select the better of the two resulting compressed images. A flag may be used to indicate the compression technique selected.

Image encoding and/or decoding system 500 may include a processor 505 that may be used to control the general operation of image encoding and/or decoding system 500. For example, processor 505 may execute an operating system that may serve as an interface between hardware in image encoding and/or decoding system 500 and a user. Processor 505 may also be responsible for performing tasks and operations not specifically involved with image encoding/decoding.

Image encoding and/or decoding system 500 may also include an image processor 510. Image processor 510 may implement algorithms used for image encoding/decoding, such as JPEG compression as well as image compression with CS. Usually, image processor 510 may be implemented in hardware to maximize image encoding/decoding performance. Image processor 510 may be implemented as a separate circuit included in image encoding and/or decoding system 500 or image processor 510 may be integrated into a single integrated circuit with processor 505. In an alternative embodiment, image processor 510 and processor 505 may be integrated into separate integrated circuits, but the separate integrated circuits may be combined into a single multi-chip module.

Image encoding and/or decoding system 500 may also include a memory 515. Memory 515 may include both volatile and non-volatile memory, with the volatile memory potentially being used to store incoming and outgoing images, data generated during image encoding/decoding, program space to store applications as they are being executed, and so forth. While, non-volatile memory may be used to store applications, data, control setting, and so on. Image encoding and/or decoding system 500 may also include an input/output (I/O) unit 520 that may be used to control movement of data, information, programs, user input and commands, and so forth, into and out of image encoding and/or decoding system 500. A display 525 may be used to allow interaction with a user.

The various components of image encoding and/or decoding system 500 may be interconnected via a high-speed connection, such as a communications bus. The communications bus may allow for rapid exchange of applications, image data, and so forth.

Although the discussion focuses on image compression/decompression, image encoding and/or decoding system 500 may be readily extended to perform video compression/decompression using standard compression/decompression techniques and compression/decompression techniques with CS. Therefore, the discussion of image compression/decompression should not be construed as being limiting to either the scope or the spirit of the embodiments.

Figure 5B:
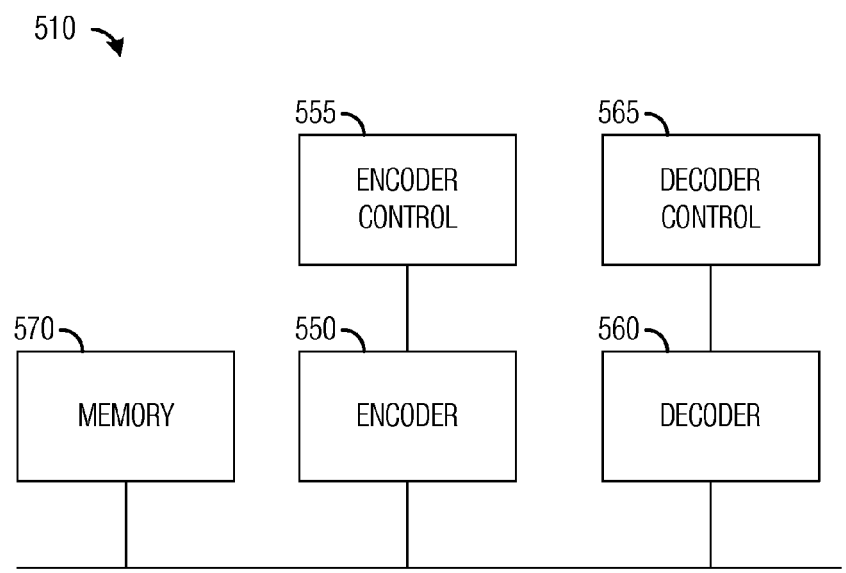
FIG. 5*b* is a diagram of a detailed view of an image processor.

FIG. 5b illustrates a detailed view of an image processor 510. Image processor 510 may include an encoder 550 that may be controlled by an encoder controller 555. Encoder 550 may support the compression of images using standard compression techniques, such as JPEG compression, and image compression with CS. If image processor 510 supports both image encoding and decoding, then image processor 510 may include a decoder 560 and a decoder controller 565. Decoder 560 may support the decompression of images using standard decompression techniques, such as JPEG decompression, and image decompression with CS. Image processor 510 may also include a memory 570 that may be located in close proximity to encoder 550 and decoder 560. Memory 570 may be used as input and/or output buffers to store image data. Logically, memory 570 may be a part of memory 515.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for decompressing a two-dimensional discrete cosine transform (DCT) compressed image, the method being performed on a processor, the method comprising:
    selecting one of a plurality of compressed image blocks in the two-dimensional DCT compressed image;
    entropy decoding the selected compressed image block; and
    recovering an image block corresponding to the decoded selected compressed image block using compressive sensing recovery, wherein recovering the image block comprises applying a total variance minimization optimization to the decoded selected compressed image block, and wherein the total variance minimization optimization is expressed as $\min \|x\|_{TV}$ subject to $-q/2 \leq Ax-y \leq q/2$, where x is the image block to be decoded, TV is total variance, A is a measurement matrix, s is measurements of the image block x, and q is a quantization step size.

2. The method of claim 1, wherein recovering the image block comprises solving a second order cone programming problem expressible as:

$\hat{s}$=arg min TV($s$), $s.t.\Theta\hat{s}=y$, where $\hat{s}$ is a recovered signal, s is an original signal, and y is measurements of the signal s.

3. The method of claim 1, further comprising:
    repeating the selecting, the entropy decoding, and the recovering for each compressed image block in the plurality of compressed image blocks to recover image blocks corresponding to each of the compressed image blocks; and
    recovering an original image by combining each of the image blocks.

4. A method for decompressing a two-dimensional discrete cosine transform (DCT) compressed image, the method being performed on a processor, the method comprising:
    a) selecting one of a plurality of compressed image blocks in the two-dimensional DCT compressed image;
    b) entropy decoding the selected compressed image block;
    c) determining whether the decoded selected compressed image block was compressed without compressive sensing;
    d) when the decoded selected compressed image block was compressed without compressive sensing, transforming the decoded selected compressed image block into a pixel domain image block; and
    e) when the decoded selected compressed image block was compressed with compressive sensing, recovering an image block corresponding to the decoded selected compressed image block using compressive sensing recovery, wherein recovering the image block comprises applying a total variance minimization optimization to the decoded selected compressed image block, and wherein the total variance minimization optimization is expressed as $\min \|x\|_{TV}$ subject to $-q/2 \leq Ax-y \leq q/2$, where x is the image block to be decoded, TV is total variance, A is a measurement matrix, y is measurements of the image block x, and q is a quantization step size.

5. The method of claim 4, further comprising, unquantizing the selected compressed image block.

6. The method of claim 4, further comprising:
    repeating a), b), c), d), and e) for each compressed image block in the plurality of image blocks to recover image blocks corresponding to each of the compressed image blocks; and
    recovering an original image by combining each of the image blocks.

7. The method of claim 4, wherein the selected compressed image block comprises a flag indicating whether the selected compressed image block was compressed with or without compressive sensing.

8. The method of claim 4, wherein transforming the decoded selected compressed image block comprises applying an inverse discrete cosine transform to the decoded selected compressed image block.

9. An apparatus for decompressing a two-dimensional discrete cosine transform (DCT) compressed image, the apparatus comprising:
    a processor; and
    a computer readable storage medium storing programming for execution by the processor, the programming including instructions to:
        select one of a plurality of compressed image blocks in the two-dimensional DCT compressed image;
        entropy decode the selected compressed image block; and
        recover an image block corresponding to the decoded selected compressed image block using compressive sensing recovery, wherein the instructions to recover the image block comprise instructions to apply a total variance minimization optimization to the decoded selected compressed image block, and wherein the total variance minimization optimization is expressed as $\min \|x\|_{TV}$ subject to $-q/2 \leq Ax-y \leq q/2$, where x is the image block to be decoded, TV is total variance, A is a measurement matrix, s is measurements of the image block x, and q is a quantization step size.

10. The apparatus of claim 9, wherein the instructions to recover the image block comprise instructions to solve a second order cone programming problem expressible as:

$\hat{s}$=arg min TV($s$), $s.t.\Theta\hat{s}=y$, where ŝ is a recovered signal, s is an original signal, and y is measurements of the signal s.

11. The apparatus of claim 9, wherein the programming further comprises instructions to:
   repeat the instructions to select, entropy decode, and recover for each compressed image block in the plurality of image blocks to recover image blocks corresponding to each of the compressed image blocks; and
   recover an original image by combining each of the image blocks.

12. An apparatus for decompressing a two-dimensional discrete cosine transform (DCT) compressed image, the apparatus comprising:
   a processor; and
   a computer readable storage medium storing programming for execution by the processor, the programming including instructions to:
   a) select one of a plurality of compressed image blocks in the two-dimensional DCT compressed image;
   b) entropy decode the selected compressed image block;
   c) determine whether the decoded selected compressed image block was compressed without compressive sensing;
   d) when the decoded selected compressed image block was compressed without compressive sensing, transform the decoded selected compressed image block into a pixel domain image block; and
   e) when the decoded selected compressed image block was compressed with compressive sensing, recover an image block corresponding to the decoded selected compressed image block using compressive sensing recovery, wherein the instructions to recover the image block comprise instructions to apply a total variance minimization optimization to the decoded selected compressed image block, and wherein the total variance minimization optimization is expressed as $$\min \lVert x \rVert_{TV} \text{ subject to } -q/2 \leq Ax - y \leq q/2,$$

where x is the image block to be decoded, TV is total variance, A is a measurement matrix, y is measurements of the image block x, and q is a quantization step size.

13. The apparatus of claim 12, wherein the programming further comprises instructions to unquantize the selected compressed image block.

14. The apparatus of claim 12, wherein the programming further comprises instructions to:
   repeat a), b), c), d), and e) for each compressed image block in the plurality of image blocks to recover image blocks corresponding to each of the compressed image blocks; and
   recover an original image by combining each of the image blocks.

15. The apparatus of claim 12, wherein the selected compressed image block comprises a flag indicating whether the selected compressed image block was compressed with or without compressive sensing.

16. The apparatus of claim 12, wherein the instructions to transform the decoded selected compressed image block comprise instructions to apply an inverse discrete cosine transform to the decoded selected compressed image block.

* * * * *

UNITED STATES PATENT AND TRADEMARK OFFICE
CERTIFICATE OF CORRECTION

PATENT NO.         : 8,805,106 B2
APPLICATION NO.    : 12/566473
DATED              : August 12, 2014
INVENTOR(S)        : Han et al.

Page 1 of 1

It is certified that error appears in the above-identified patent and that said Letters Patent is hereby corrected as shown below:

In the Claims

Col. 11, line 45, claim 1, delete "s is measurements" and insert --y is measurements--.
Col. 12, line 61, claim 9, delete "s is measurements" and insert --y is measurements--.

Signed and Sealed this
Fourteenth Day of October, 2014

Michelle K. Lee
*Deputy Director of the United States Patent and Trademark Office*